May 2, 1939. M. MORGAN ET AL 2,157,000
SHEARING MECHANISM
Filed Oct. 14, 1937 3 Sheets-Sheet 2

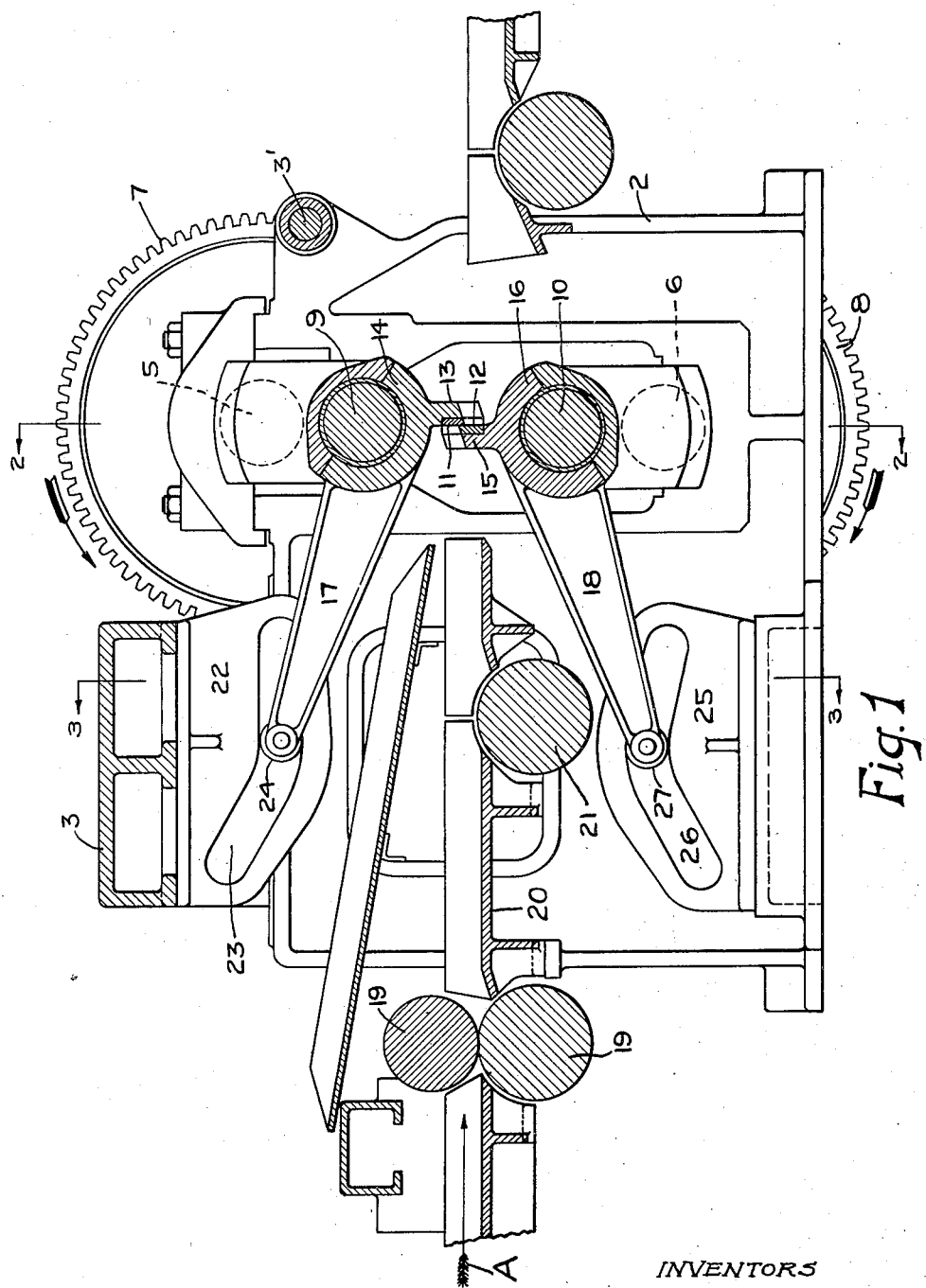

INVENTORS
MYLES MORGAN
JOHN W. SHEPERDSON
BY Geo. H. Kennedy jr.
ATTORNEY

Patented May 2, 1939

2,157,000

UNITED STATES PATENT OFFICE 2,157,000

SHEARING MECHANISM

Myles Morgan and John W. Sheperdson, Worcester, Mass., assignors to Morgan Construction Company, Worcester, Mass., a corporation of Massachusetts Application October 14, 1937, Serial No. 168,963

14 Claims. (Cl. 164—43)

The present invention relates to shearing mechanisms, and more particularly to mechanisms adapted for the shearing or cutting up of elongated metal bars, billets and the like while the same are in motion. In one type of shearing mechanism for this purpose, the material to be sheared, moving lengthwise, passes between a pair of movable blades,—each of the latter being arranged to travel, either continuously or in start and stop fashion, in substantially circular paths, so as to bring said blades periodically into cutting opposition with each other as they engage and move with the travelling material. When such material is of appreciable or considerable thickness,—a condition that involves its being engaged by both blades well in advance of their actual cutting opposition or overlap,—there is need to establish and to maintain, for substantially the duration of the blades' contact with the material, a relation of substantial parallelism between the respective cutting surfaces of said blades; otherwise, the blades cannot obtain a clean square or straight-line cut of said material.

Although in recognition of this problem, various arrangements have heretofore been proposed to obtain this desired parallelism of blade surfaces during the periods of stock engagement, it is nevertheless a fact that no such prior arrangement has proven satisfactory for shearing anything but relatively light materials. In one such proposed construction, each blade, while travelling in a substantially circular path, is arranged to rotate about a pivotal axis under the influence of a cam surface which encircles the center of said circular path; with such a construction, it is not possible as a practical matter to support the blades properly against the tremendous forces encountered in the shearing of relatively thick or heavy metal stock. In still another proposed construction, the two blades, while travelling in their respective circular paths, are maintained in substantial parallelism at all times, either by an arrangement of interconnected gearing, or by guiding devices connecting one blade with the other; such arrangements lack the strength and rigidity required for any heavy shearing work.

One object of our invention is to provide a simple, inexpensive and thoroughly reliable mechanism of this type for the shearing of relatively heavy metal stock while the same is in motion. Another object is to provide a shearing mechanism whose two cooperating shear blades which move in substantially circular paths are maintained in substantial parallelism throughout each period of engagement with the stock and which are so arranged and constructed as to withstand heavy cutting loads without undue strain and serious wear.

A further object of the invention is to provide in such a shearing mechanism a rugged and reliable means for imparting to each blade, at the proper point in its substantially circular path, an oscillatory motion, which may be different for one blade as compared to the other blade. Another object of the invention is to arrange in such a shearing mechanism for the blades to make clean and accurate cuts on heavy moving stock and to clear such stock properly following the completion of each cut. Other and further objects and advantages of our invention will be made apparent by the following detailed description thereof, taken in connection with the accompanying drawings, wherein Fig. 1 is a vertical sectional view of our improved shearing mechanism, the section being taken on the line 1—1 of Fig. 2.

Like reference characters refer to like parts in the different figures.

Figure 3:
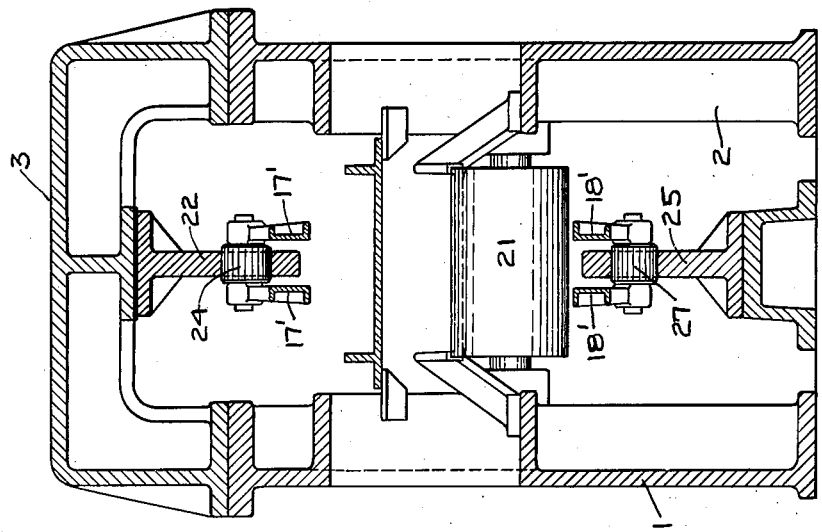
Fig. 3 is a transverse sectional view on the line 3—3 of Fig. 1.
Figure 2:
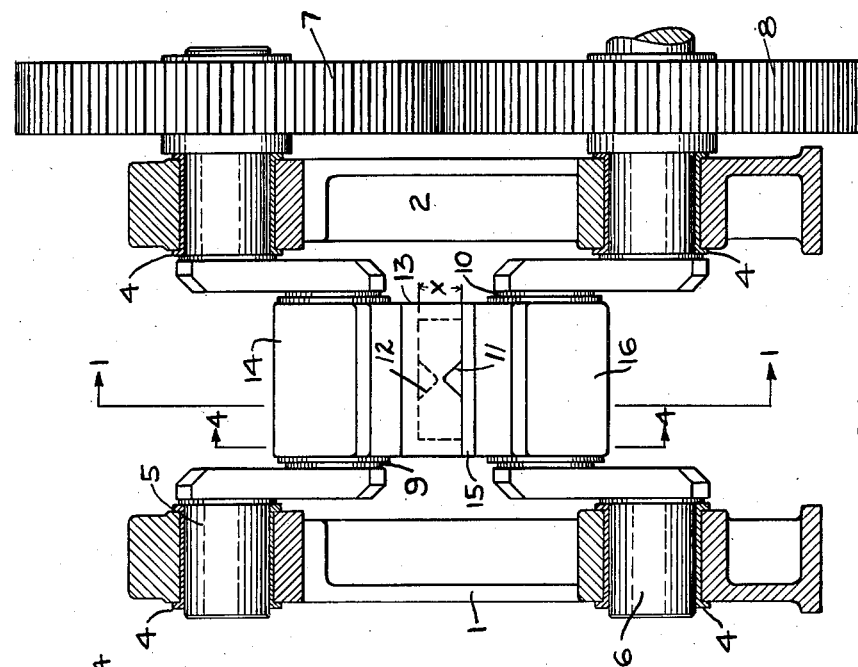
Fig. 2 is a transverse sectional view on the line 2—2 of Fig. 1.
Figure 4:
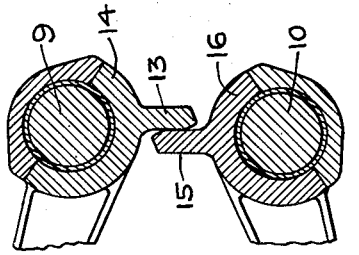
Fig. 4 is a fragmentary sectional view, the section being taken on the line 4—4 of Fig. 2.

Referring to Figs. 1, 2 and 3, our improved shearing mechanism is shown as mounted in a suitable frame composed of two upright side members 1 and 2, which are connected at the top by a bridging member 3 and a brace 3'. The side members 1 and 2 provide suitable bearings 4, 4, Fig. 2, for an upper crankshaft 5, and also for a lower crankshaft 6, the said two shafts having secured thereon intermeshing gears 7 and 8, respectively; in this way, the two shafts are caused to be rotated in unison, from any suitable source of power, not shown,—their directions of rotation, with the stock moving from left to right, being indicated by the arrows appearing on Figs. 1 and 5.

The upper shaft 5 provides between its journalled portions a crank portion 9, and the lower shaft 6 provides a similar crank portion 10,—these two cranks, which carry the cutting blades of the shear, having the angular relationship to each other that is common in all rotary shearing mechanism of this type, namely, that the arrival of the upper crank 9 at its lowest position coincides substantially with the arrival of the lower crank 10 at its highest position, obtaining thereby the opposition of the crank-carried blades that produces the shearing of the material moving therebetween. If the crank-carried blades, here designated 11 and 12, are rigidly secured to their respective cranks 9 and 10 in substantially radial relation to the axes of the shafts 5 and 6, it is manifest that the cutting faces of said blades will only come into actual parallelism with each other at the instant of direct opposition of the two cranks; in the approach to such opposition, under these conditions, the blade faces will stand at varying obtuse angles to each other, and similar angularity of blade faces will be in evidence as the cranks retreat from or pass beyond their position of direct opposition. Hence, the arrangement above described, with the blades secured rigidly to the respective cranks, is satisfactory for the shearing of only the very thinnest moving materials; if the material to be sheared is of appreciable thickness, so as to be engaged by the blades in their approach to the position of direct opposition of the cranks, the aforesaid absence of parallelism between the blade faces is an insurmountable obstacle to the taking of square clean cuts by said blades, as well as to a proper clearing by said blades of each other and of the material, after each cut is taken.

This is particularly true where the blades have their edges shaped or notched in substantial conformity with the cross-sectional shape of the stock; for example, with travelling stock of approximately square cross-section, it is frequently the practice to so support said stock as to dispose the two diagonals of the section in substantially horizontal and vertical positions (see Fig. 5), and to employ V-notched blades (see Fig. 2) for the shearing of the so-supported travelling stock. Under these conditions, the cut can be completed only by achieving a very decided overlap of the two blades, as represented, for example, in Fig. 2 by the distance X, at the completion of the cut, between the edge of upper blade 11 and the edge of lower blade 12. This necessity for an extensive overlap of the blades prolongs the period throughout which they need to be maintained in parallelism, in order for them to take a square clean cut on the stock; furthermore, on account of this prolonged period during which the blades need to be kept substantially parallel, there is more than ever the need for special arrangements, operative at the completion of each cut, to cause the blades, particularly the upper blade, to move clear of the stock, so as not to interfere with or obstruct the latter's advancing end.

According to our invention, the blades 11 and 12, instead of having rigid mountings on the respective cranks 9 and 10, (a condition that establishes blade parallelism only for an instant), have pivotal mountings on said cranks,—the upper blade 11 being secured for this purpose to a projecting arm 13 of a two-part hub structure 14 that encircles the crank 9, and the lower blade 12 being secured to a similar arm 15 that projects from a two-part hub structure 16 encircling the crank 10. Thus each crank 9 and 10 not only supports and secures the encircling movement of its associated blade, but also provides a trunnion for the blade-supporting structure so that the angular position of the blade, at any part of its swing, can be effectively determined and controlled.

For effecting such control, the trunnioned upper blade carrier 14 provides an arm 17, and the trunnioned lower blade carrier 16 provides an arm 18,—the two arms 17 and 18 being here shown as projecting rearwardly, in divergent relation, from the blade carriers so as to avoid any interference with the stock in its movement through the shear. Such stock movement is here shown as effected by suitable pinch rolls 19, 19 that feed the stock longitudinally in the direction shown by the arrow A, Fig. 1, substantially in the plane of the cutting oppositions of blades 11 and 12; for the support of the stock in this plane, the shearing mechanism preferably provides a table 20 and one or more rollers 21, extending across the space between the upright side members 1 and 2.

Both of the arms 17 and 18, as shown in Fig. 3, are preferably bifurcated, in the form of duplicate parallel spaced-apart sections 17', 17' and 18', 18'. The arm sections 17', 17' have their terminals on opposite sides of a stationary plate 22, preferably depending from the bridging member 3; said plate 22 provides an arcuate cam groove or slot 23, within which is received a roller or follower 24 that is suitably journalled in the terminal portions of arm sections 17', 17'. Another stationary plate 25, secured to and projecting upwardly from the base of the machine, is received in the space between the arm sections 18', 18', said plate 25 providing an arcuate cam groove 26, for the travel of a roller or follower 27 that is suitably journalled in the terminal portions of said arm sections 18', 18'. Each stationary cam groove 23, 26 is of sufficient length to accommodate the full throw of the associated follower or roller (24 or 27) as produced by a full revolution of the corresponding crank (9 or 10).

Figure 5:
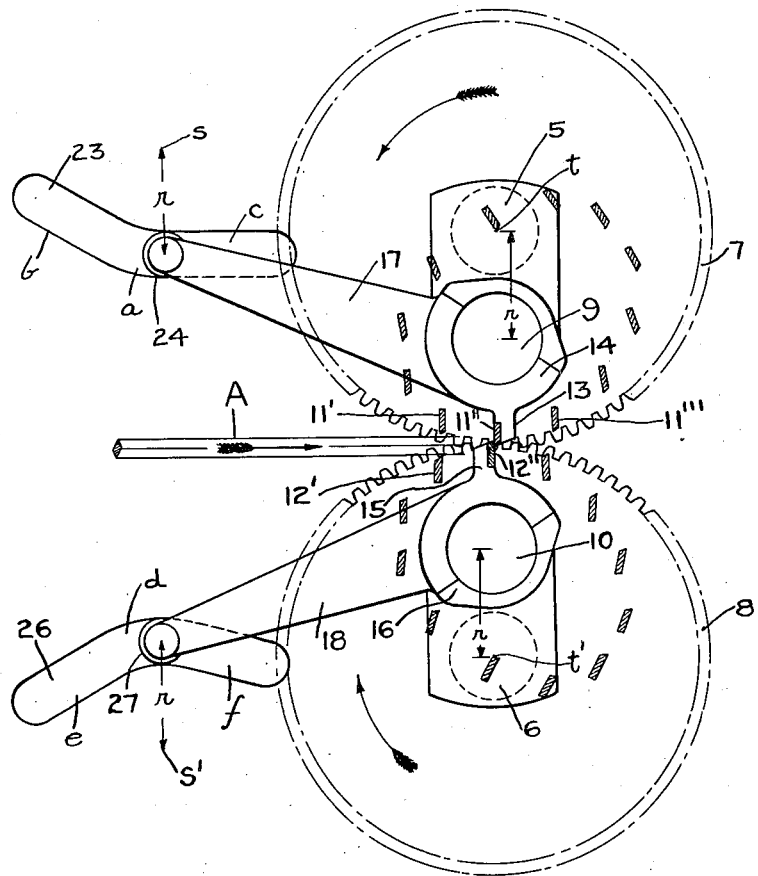
Fig. 5 is a schematic view illustrating the various angular positions of the shear blades, at different points in their paths of movement.

Referring particularly to Fig. 5, the cam groove or slot 23 has an intermediate arcuate portion $a$, from the opposite ends of which extend tangentially the substantially rectilinear or straight cam portions $b$ and $c$: similarly, the cam groove or slot 26 has an intermediate arcuate portion $d$ (preferably somewhat longer than the portion $a$ of cam 23) having tangential rectilinear extensions $e$ and $f$ from its opposite ends. The cam portions $b$ and $c$ are occupied by the respective rollers 24 and 27 during most of the time that the cranks 9 and 10 are moving through the left hand half of their circular travel, and the cam portions $c$ and $f$ are similarly occupied by the rollers 24 and 27 during most of the time of said cranks' movements through the right hand half of their circular travel. The intermediate arcuate cam portions $a$ and $d$ are effective on the rollers 24 and 27 in two zones, approximately 180° apart, in the travel of the respective cranks 9 and 10,—one of these zones being that of said cranks' approach to, passage through and retreat from the position of completed cutting opposition shown by Fig. 5.

According to our invention, the travel of the axis of roller 24 in cam portion $a$ is on a true circular arc of the same radius $r$ as cranks 9 and 10, and struck from a center $s$ that is the same distance from the axis of shaft 5 as the center-to-center distance between crank 9 and cam roller 24. Similarly, in the arcuate cam portion $d$, the axis of roller 27 moves in a true circular arc of the same radius $r$ as cranks 9 and 10, and struck from a center $s'$ whose distance from the axis of shaft 6 corresponds to the center-tocenter distance between crank 10 and roller 27.

The two cranks 9 and 10 are in step with each other, and their associated rollers 24 and 27 in their movements from left to right, Fig. 5, are arranged to enter simultaneously the arcuate cam portions, $a$ and $d$, respectively; at this instant, on account of arms 13 and 15 extending in a certain fixed angular relation to the arms 17 and 18, respectively, the two blades 11 and 12 will stand in the positions illustrated at 11' and 12' in Fig. 5, with their cutting faces substantially perpendicular to the plane of stock travel. This perpendicularity of blade 11 is maintained all through the ensuing movement of roller 24 in cam portion $a$, by reason of the radial relations above described which constrain a "parallel motion" for the angular structure 13, 14, 17 about the centers $s$ and $t$. The same is true for the blade 12, the latter's perpendicularity being maintained during the passage of roller 27 in cam portion $d$, because of the "parallel motion" on centers $s'$ and $t'$ that is constrained upon the angular structure 15, 16, 18.

It follows that this perpendicularity and parallelism of blade faces, established as above described in the approach to cutting position and before actual contact of either blade with the stock occurs, will be maintained all through the movement of said blades from the positions 11', 12' to the positions 11'', 12'', Fig. 5, the last named positions illustrating the maximum overlap of said blades that completes the severance of the stock. Thus the blades 11 and 12 are squarely opposed to each other, with their cutting faces in the same plane, from the time of their initial engagement with the stock until the cut is completed, thereby producing a square clean cut at each revolution of the shear. As is usual in mechanisms of this type, the cranks 4 and 5 have sufficient angular velocity of cause the horizontal motion of the blades 11 and 12, while the cut is being taken, to correspond substantially with the linear speed of the stock.

The two blades 11 and 12 attain their maximum horizontal velocity substantially at the instant of completion of the cut, as shown in Fig. 5. Thereafter, due to the vertical components of the crank motions, the blades' horizontal speed drops off somewhat, and if it falls materially below the stock speed, there is the possibility that the advancing end of the stock, though cleared by the lower blade 12 which immediately moves below the plane of stock support, will overtake and crowd against the upper blade 11, preventing the latter from clearing properly. In order to avoid this possibility, the arcuate cam portion $a$ is preferably ended, as shown in Fig. 5, substantially at the position reached by follower 24 at the instant of the completion of the cut,— the follower 24 then passing into the rectilinear cam portion $c$, the effect of which is to tip or rock the blade 11 out of its perpendicular relation to the plane of stock travel, as shown at 11''', Fig. 5, so that the advancing end of the stock can pass freely beneath said blade. This accelerates the blade 11, in the direction of travel of the stock, thus keeping it ahead of the oncoming end of the stock.

As also depicted in Fig. 5, the cam motion herein shown as imposed on the two blades 11 and 12 in the circular travel of their respective cranks 9 and 10, causes said blades to describe substantially elliptical paths, in which at all times the cutting edges of said blades are faced in the general direction of the stock; in other words, neither blade is at any time subject to more than very slight angular displacement from its perpendicular cutting position, thus making unnecessary any provision for sharp sudden movements to be imparted to either blade, in order to dispose the same in cutting position, as is the case when one or both of the blades are allowed, at some part or point in their movements, to face away from the plane of the travelling stock. The shearing mechanism of our invention lends itself particularly to massiveness and strength of parts, the arrangement being such that it is possible at all times to support the blades properly, by their cranks 9 and 10 and by their associated cam motions against the tremendous forces encountered in the shearing of thick heavy metal stock. That is to say, in our improved cam action as distinguished, for example, from that of Kalko patent, No. 1,989,012, January 22, 1935, there is never any opportunity for free or uncontrolled rocking movements of either of the blade-supports of its associated crank; on the contrary, our cam controls are at all times positive in action, and they not only compel the blades to assume the angular positions shown by Fig. 5, particularly in their approach to and movement through the cutting zone, but also they are arranged to resist to the utmost, especially during the periods of actual stock engagement by the blades, the powerful forces and thrusts which, in the absence of such effective resistance, would tend to rock the blade-supports, and thereby disturb the desired parallelism and perpendicularity of the blades' cutting surfaces.

We claim:

1. In mechanism of the class described for the shearing of moving stock, the combination with two cooperating blades, each projecting from a member mounted pivotally on a crank, the two cranks by their rotation in step with each other procuring periodic cutting oppositions of said blades, of fixed guide means engaging said members and arranged to position and hold said blades in substantially parallel relation during the period of each cutting opposition.

2. In mechanism of the class described for the shearing of moving stock, the combination with two cooperating blades, each projecting from a member mounted pivotally on a crank, the two cranks by their rotation in step with each other procuring periodic cutting oppositions of said blades, of fixed guide means engaging the end of each member and confining same to a generally reciprocatory path, to prevent any free or uncontrolled pivotal movement thereof on its associated crank.

3. In mechanism of the class described for the shearing of moving stock, the combination with two cooperating blades, each projecting from a member mounted pivotally on a crank, the two cranks by their rotation in step with each other procuring periodic cutting oppositions of said blades, of cam means cooperating positively with said pivotally mounted members, as their cranks approach opposition, to position and hold said blades in substantially perpendicular relation to the plane of the moving stock.

4. In mechanism of the class described for the shearing of moving stock, the combination with two cooperating blades, each projecting from a member mounted pivotally on a crank, the two cranks by their rotation in step with each other procuring periodic cutting oppositions of said blades, of means for restraining a portion of each member, in its movement by the associated crank, to a generally reciprocatory path, the intermediate portion of which is a circular arc having a radius substantially equal to that of the associated crank, thereby to keep each blade, in all positions of its crank, faced toward the moving stock, and to effect a parallel motion of each member during each period of cutting opposition of said blades.

5. In mechanism of the class described for the shearing of moving stock, the combination with two cooperating blades, each projecting from a member mounted pivotally on a crank, the two cranks by their rotation in step with each other procuring periodic cutting oppositions of said blades, of a projection from each member, and a fixed guide confining the end of said projection to a generally reciprocatory path.

6. In mechanism of the class described for the shearing of moving stock, the combination with two cooperating blades, each projecting from a member mounted pivotally on a crank, the two cranks by their rotation in step with each other procuring periodic cutting oppositions of said blades, of a projection from each member, and a fixed guide confining the end of said projection to a generally reciprocatory path, a portion of said guide, in conjunction with the crank motion, producing a parallel motion of said member during movement of the latter's blade through the stock.

7. In mechanism of the class described for the shearing of moving stock, the combination with two cooperating blades, each projecting from a member mounted pivotally on a crank, the two cranks by their rotation in step with each other procuring periodic cutting oppositions of said blades, of a projection from each member, and a fixed guide for the end of said projection to govern the angular position of the associated blade, the guide surfaces effective during the cutting action of said blade being arranged to receive and resist the cutting forces.

8. In shearing mechanism of the class described, the combination with a pair of crank-carried blades adapted to be brought periodically into opposition by the rotation of their carrying cranks, of a supporting member for each blade having a pivotal mounting on the associated crank and having a projection in fixed angular relation to the blade surface, and a fixed guiding means to constrain the end of said projection to a generally reciprocatory path, a portion of each path being in an arc so related to the crank motion as to effect a parallel motion of the associated member.

9. In shearing mechanism of the class described, a pair of crank-carried blades, a support for each blade having pivotal mounting on the associated crank, and a fixed guiding means engaged by each support and adapted to impose on said crank motion a positive cam motion to hold each blade in substantial parallelism with the other blade during the approach of said blades to and their passage through the cutting zone.

10. In shearing mechanism of the class described, the combination with a pair of crank-carried blades adapted to be brought periodically into opposition by the rotation of their carrying cranks, of a supporting member for each blade having a pivotal mounting on the associated crank and having a projection in fixed angular relation to the blade surface, and a fixed guiding means to constrain the end of said projection to a generally reciprocatory path, a portion of each path being in an arc so related to the crank motion as to effect a parallel motion of the associated member, said arcs for the two members being of different lengths, to discontinue the parallel motion of one member ahead of that of the other member.

11. In mechanism of the class described for the shearing of moving stock, the combination with two cooperating blades, each projecting from a member mounted pivotally on a crank, the two cranks by their rotation in step with each other procuring periodic cutting oppositions of said blades, of means to control the pivotal movement of each member on its associated crank and cause one of said baldes to accelerate in the direction of travel of the stock immediately after the completion of each cut to avoid interference with the on-coming stock.

12. In mechanism of the class described for the shearing of moving stock, the combination with two cooperating blades, means to move the blades in separate closed paths of travel arranged to bring the blades into cutting opposition periodically, and means to accelerate one of said blades in the direction of travel of the stock immediately after the completion of each cut to avoid interference with the on-coming stock.

13. In mechanism of the class described for the shearing of moving stock, the combination with two cooperating blades, means to move the blades in separate closed paths of travel arranged to bring the blades into cutting opposition periodically with one blade advanced beyond the other in the direction of stock travel, and means to accelerate the said advanced blade in said direction immediately after the completion of each cut to avoid interference with the on-coming stock.

14. In mechanism of the class described for the shearing of moving stock, the combination with a pair of crank-carried blades adapted to be brought periodically into opposition by the rotation of their carrying cranks with one blade advanced beyond the other in the direction of stock travel, of a supporting member for each blade having a pivotal mounting on the associated crank and having a projection in fixed angular relation to the blade surface, and a fixed guiding means to constrain a part of each projection to a generally reciprocatory path, a portion of each said path being in a circular arc having a radius substantially equal to that of the associated crank and so related to the crank motion as to effect a parallel motion of the associated member, the path associated with said advanced blade being shaped to produce, as the blades complete their cutting opposition, a recession of the constrained part of the associated projection from the center of the circular arc portion of said path, thereby to accelerate said advanced blade in the direction of stock movement.

MYLES MORGAN.
JOHN W. SHEPERDSON.